(12) United States Patent
Taylor et al.

(10) Patent No.: US 11,313,063 B2
(45) Date of Patent: *Apr. 26, 2022

(54) NEEDLE PUNCHED CARPET

(71) Applicant: Autoneum Management AG, Winterthur (CH)

(72) Inventors: James Taylor, Volketswil (CH); Michael Kiessig, Sao Bernardo do Campo SP (BR); Meganathan Meenakshisundaram, Winterthur (CH)

(73) Assignee: AUTONEUM MANAGEMENT AG, Winterthur (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/657,751

(22) Filed: Oct. 18, 2019

(65) Prior Publication Data

US 2020/0048806 A1 Feb. 13, 2020

Related U.S. Application Data

(63) Continuation of application No. 14/400,837, filed as application No. PCT/EP2013/059501 on May 7, 2013, now Pat. No. 10,465,320.

(30) Foreign Application Priority Data

May 12, 2012 (EP) ..................................... 12167999

(51) Int. Cl.
*D04H 11/08* (2006.01)
*B32B 5/02* (2006.01)
(Continued)

(52) U.S. Cl.
CPC ............. *D04H 11/08* (2013.01); *B32B 5/022* (2013.01); *B60N 3/042* (2013.01); *B60N 3/048* (2013.01);
(Continued)

(58) Field of Classification Search
USPC ...... 428/85, 376, 391; 442/402, 403; 28/107
See application file for complete search history.

(56) References Cited

U.S. PATENT DOCUMENTS

| 2,939,201 A | 6/1960 | Holland |
| 3,262,257 A | 7/1966 | Martin |

(Continued)

FOREIGN PATENT DOCUMENTS

| CN | 101338455 | 1/2009 |
| DE | 10 2009 031327 | 2/2010 |

(Continued)

OTHER PUBLICATIONS

International SearchReport in PCT/EP2013/059501, dated Jun. 5, 2013 (4 pages).
(Continued)

*Primary Examiner* — Lynda Salvatore
(74) *Attorney, Agent, or Firm* — FisherBroyles, LLP; Craig W. Mueller

(57) ABSTRACT

A needle punched carpet for use in a car is disclosed. The needle punched carpet comprises at least a needle punched facing layer defining a top layer and made of staple fibers. The staple fibers comprise hollow fibers having a hollow fiber content that is at least more than 45 weight % of the total staple fibers.

29 Claims, 3 Drawing Sheets

(51) Int. Cl.
*B60N 3/04* (2006.01)
*D04H 1/542* (2012.01)
*D04H 1/435* (2012.01)
*D04H 1/46* (2012.01)
*D04H 1/732* (2012.01)
*D04H 1/4334* (2012.01)
*D04H 1/74* (2006.01)
*D06N 7/00* (2006.01)
*D04H 1/541* (2012.01)
*D04H 1/4391* (2012.01)

(52) U.S. Cl.
CPC .......... *D04H 1/435* (2013.01); *D04H 1/4334* (2013.01); *D04H 1/43912* (2020.05); *D04H 1/43914* (2020.05); *D04H 1/46* (2013.01); *D04H 1/542* (2013.01); *D04H 1/5418* (2020.05); *D04H 1/732* (2013.01); *D04H 1/74* (2013.01); *D06N 7/0068* (2013.01); *B32B 2471/02* (2013.01); *Y10T 428/23929* (2015.04); *Y10T 428/23936* (2015.04); *Y10T 428/23957* (2015.04)

(56) References Cited

U.S. PATENT DOCUMENTS

| | | | |
|---|---|---|---|
| 3,686,848 A | | 8/1972 | Miller et al. |
| 4,195,051 A | | 3/1980 | Frankfort et al. |
| 4,295,329 A | | 10/1981 | Windley |
| 5,108,838 A | | 4/1992 | Tung |
| 5,144,730 A | * | 9/1992 | Dilo .................. D04H 1/46 28/109 |
| 5,332,457 A | | 7/1994 | Katoh et al. |
| 5,486,419 A | | 1/1996 | Clementini et al. |
| 5,587,229 A | | 12/1996 | Clementini et al. |
| 5,622,765 A | | 4/1997 | Clementini et al. |
| 5,786,083 A | | 7/1998 | Harris |
| 5,804,115 A | | 9/1998 | Burton et al. |
| 5,945,215 A | | 8/1999 | Bersted et al. |
| 5,997,980 A | * | 12/1999 | Matoba .................. D04H 1/60 428/85 |
| 6,090,485 A | | 7/2000 | Anderson et al. |
| 6,145,617 A | | 11/2000 | Alts |
| 6,548,141 B2 | | 4/2003 | Nagata et al. |
| 6,631,785 B2 | | 10/2003 | Khambete et al. |
| 6,716,511 B2 | | 4/2004 | Bersted et al. |
| 6,740,385 B2 | | 5/2004 | Gardner et al. |
| 8,287,983 B2 | * | 10/2012 | Emirze .................. D04H 3/147 428/97 |
| 10,465,320 B2 | * | 11/2019 | Taylor .................. B60N 3/042 |
| 2001/0008673 A1 | | 7/2001 | Nagata |
| 2002/0034606 A1 | | 3/2002 | Miller et al. |
| 2002/0172795 A1 | | 11/2002 | Gardner et al. |
| 2003/0194529 A1 | | 10/2003 | Bersted et al. |
| 2005/0249931 A1 | | 11/2005 | Utsumi |
| 2005/0260380 A1 | | 11/2005 | Moon et al. |
| 2006/0121813 A1 | * | 6/2006 | Kobayashi ............... B32B 5/26 442/415 |
| 2007/0009723 A1 | | 1/2007 | Ogawa et al. |
| 2008/0292831 A1 | | 11/2008 | Juriga et al. |
| 2012/0064281 A1 | | 3/2012 | Taylor et al. |
| 2015/0224943 A1 | | 8/2015 | Taylor et al. |
| 2016/0298273 A1 | | 10/2016 | Meenakshisundaram et al. |

FOREIGN PATENT DOCUMENTS

| | | |
|---|---|---|
| EP | 0518690 | 10/1992 |
| EP | 0902115 | 3/1999 |
| EP | 1669490 | 6/2006 |
| EP | 0934180 | 8/2009 |
| EP | 2364881 | 9/2011 |
| EP | 2365483 | 4/2012 |
| FR | 2942829 | 9/2010 |
| GB | 2297059 | 7/1996 |
| JP | S 60180643 | 11/1985 |
| JP | H 04185755 | 7/1992 |
| JP | 5186947 | 7/1993 |
| JP | H 09175427 | 7/1997 |
| JP | 9241956 | 9/1997 |
| JP | 10 329596 | 12/1998 |
| JP | H 11139193 | 5/1999 |
| JP | 2003 300290 | 10/2003 |
| JP | 2004325973 | 11/2004 |
| JP | 2005097816 | 4/2005 |
| JP | 2005263225 | 9/2005 |
| JP | 2008024066 | 2/2008 |
| JP | 2008295477 | 12/2008 |
| JP | 2009 195386 | 9/2009 |
| WO | WO2005024104 | 3/2005 |
| WO | WO2006066601 | 6/2006 |

OTHER PUBLICATIONS

International Preliminary Report on Patentability for International (PCT) Patent Application No. PCT/EP2013/059501, dated Nov. 18, 2014, 6 pages.

International Search Report and Written Opinion for International (PCT) Patent Application No. PCT/EP2010/056700, dated Oct. 4, 2010, 7 pages.

International Preliminary Report on Patentability for International (PCT) Patent Application No. PCT/EP2010/056700, dated Nov. 22, 2011, 4 pages.

International Search Report and Written Opinion for International (PCT) Patent Application No. PCT/EP2014/073776, dated Jan. 27, 2015, 9 pages.

International Preliminary Report on Patentability for International (PCT) Patent Application No. PCT/EP2014/073776, dated May 24, 2016, 6 pages.

Official Action for U.S. Appl. No. 14/177,364, dated Feb. 17, 2017, 10 pages.

* cited by examiner

NEEDLE PUNCHED CARPET

This application is a continuation of U.S. patent application Ser. No. 14/400,837, filed Nov. 13, 2014, which is the U.S. National Phase of PCT/EP2013/059501, filed May 7, 2013, which claims the benefit of European Patent Application No. 12167999.7, filed May 15, 2012, the entireties of which are incorporated by reference herein.

TECHNICAL FIELD

The invention relates to a needle punched carpet for use in automotive interiors, for instance covering of the main flooring, optional mats, seat backs, parcel shelves, pillar trim or covering of areas in the trunk or boot of a vehicle.

BACKGROUND ART

Automotive interiors and trunks were traditionally lined with various types of fabrics, but in more recent years tufted and needle punched carpets are used mostly.

Needle punched carpets, as known in the automotive industry comprise in general of:

At least a needle punched decorative face layer, produced from fibrous webs which may be made on a card, and which are cross lapped to increase area weight. The thus formed web is reinforced and consolidated by the reciprocating action of barbed needles repeatedly penetrating the web so that the material becomes matted and decreases in thickness. Eventually a second needling step can be used to obtain a surface pattern from the action of crown or fork needles, for instance a dilour or ribbed surface, and Eventually one or more backing layers at the backside of the carpet, for instance a latex, thermoplastic, felt or foam layer, or combinations of those materials.

EP 0518690 A discloses the use of conjugate fibers together with polypropylene fibers to form the needle punched top layer. The needle punched mat is subjected to a heat treatment to melt the conjugate fibers and to further bind the needle punched top layer increasing the overall performance of the so formed carpet. According to the disclosure by using conjugate fibers in a staple fiber mixture as disclosed the needle punched carpet does not need a backing layer.

Hollow fibers are mainly used for filling of bedding material or outerwear, due to the increase volume by weight the material is lighter and due to the higher level of air entrapped the thermal insulation is increased. Furthermore it is known to use hollow fibers for acoustic felts, partly used as acoustic backing layer for both needle punched and tufted automotive carpets. However the use of staple fibers with hollow cross section for needle punched carpet face layer has not been shown before. It is widely believed that in particularly a hollow cross section is prone to a higher risk of fibrillation or breakage and therefore would not work for a needle punched carpet surface layer, prone to abrasion due to wear.

Automotive carpets are subjected to wear mainly from shoes. The wear of an automotive carpet is more local abrasion due to the movement of the shoes than a compression due to normal walking (typical wear for home and industrial carpeting). In particularly the area under brake and gear pedals is heavy subjected to such a wear. However, also the trunk when heavily used for loads is subjected to an increase in wear. Therefore the automotive industry uses the abrasion performance as one of the important criteria for selecting suitable needle punched carpets. Abrasion properties are often but not exclusively measured using a taber test measurement according to SAE standard. The maximum weight loss during the first 300 cycles and/or the maximum amount of cycles before a first hole is visible, are evaluation criteria that differ per car maker.

To reach the criteria of car makers very often the weight of the basic mat is increased. However the trend in the automotive industry is to more lightweight products, as every kilo of material used in a vehicle is directly related to the fuel efficiency and $CO_2$ release of that vehicle.

Another criterion is the visual appearance of the carpet after a period of wear, or at the end of an abrasion test. Due to the wear, damage and/or breakage of the top fibers occurs, this can cause a whitening effect of in particularly (black-) colored carpets. This whitening effect is an unwanted feature that decreases the use expectance of a carpet surface. In particularly with the needle punch carpets made of solid fibers this poses a problem. As this whitening effect is a prominent problem for needle punch carpets momentarily on the market. These type of carpets are mainly accepted in the mid and lower segment cars and not in high end cars.

SUMMARY OF THE INVENTION

It is the objective of the invention to optimize the overall wear properties of a needle punched carpet for automotive use and/or alternatively to obtain a needle punched carpet with the same abrasion performance as current needle punched carpets at a lower overall weight. Furthermore it is an objective to obtain a carpet with the same or better overall performance as the needle punched carpet today on the market.

The objective is obtained with the needle punched carpet face layer according to the invention, with the features of the main claim. In particularly by using staple fibers with a hollow cross-section, it was found that abrasion performance of the needle punched carpets was increased in comparison to the same produced needle punched carpets made of round solid staple fibers.

Surprisingly, it was found that a needle punched carpet with a surface substantially made of hollow fibers has an increased abrasion performance. It is known that the use of hollow fibers has the advantage that the layer can be made lighter, keeping a high fiber density due to the void volume in the fiber itself. However the unexpected increase of the abrasion performance makes it possible to decrease the area weight used in carpet top layers even further and at the same time keeping visually good carpet appearance.

Surprisingly during the whole abrasion tests on the carpet layer made of hollow fiber according to the invention the samples did not show a substantial whitening of the abraded surface. This is an important criterion for the carpet surface used in the interior of a car in particularly for the acceptance of such flooring in high end cars.

With the inventive nonwoven carpet it was possible to produce flat—roll good—as well as molded 3D carpet parts, with an abrasion performance acceptable by most car maker standards.

Hollow Staple Fibers

The hollow staple fibers for the needle punch surface according to the invention have a cross section with at least one void area extending axially over the whole length of the fiber (see FIG. 3A). Also hollow fibers with multiple void areas extending axially over the whole length of the fiber can be used to form the needle punched carpet surface according to the invention. The hollow fibers used have as much as 15 to 35% void space (based on cross-section), preferably between 15%-25%.

Preferably the outer cross section of the hollow fibers is substantially rounded, circular or oval. Because of varying conditions during manufacturing the fibers are rarely perfectly formed. It can be that the polymer material around the hollow area is open so the fiber cross section is more a C than a O. Preferably the hollow or void area is one core area (2) (FIGS. 3A and 3C) substantially in the middle of the cross section. However also a cross section with a multiple of smaller hollow areas directed in the axial direction of the fiber can be used according to the invention, for instance 4 hollow tubes (2) as depicted in FIG. 3B. The hollow area may have other cross sections than the most common round shape, for instance trilobal or square, and will still fall in the scope of the invention as anticipated.

Depending on the area of the void, the density of the fibers is proportionally lower than the density of the material, for instance around 1.38 g/m$^3$ for PET.

The hollow staple fibers used are between approximately 2 and 20 dtex, preferably between 4-17 dtex. Also a mixture of dtex, for instance fine and coarse, like 12 and 17 dtex, is possible.

The staple fibers have a staple length normally used for needle punched carpet layers for automotive use, preferably substantially between 40-120 mm, preferably between 50-80 mm.

The hollow staple fibers according to the invention are preferably made of thermoplastic material, for instance polyester polymers including aromatic and aliphatic polyester polymers, or polypropylene as normally found in automotive carpets, or Polyamide like PA6 or PA66, or Poly Lactic acid (PLA). Exemplary polyester polymers include but are not limited to polyethylene terephthalate (PET), polybutylene terephthalate (PBT) or polytrimethylene terephthalate (PTT).

The carpet face layer according to the invention comprises substantially of hollow staple fibers. At least up to 100% by weight is hollow staple fibers. (The % by weight is defined as the percentage fibers based on the total fiber weight of the needle punched face layer.) Preferably the amount of hollow fibers is at least 45% by weight, preferably at least 65% by weight.

As the staple fibers are used for their specific cross section, conjugate or bicomponent fibers losing the hollow shape after needling or other process steps, because they fall apart, cannot be used in the surface layer according to the invention to form the main structural components of the needle punched surface layer.

However in areas of high wear it might be advantageous to combine the hollow staple fibers with additional binding fibers. For instance conjugate, bicomponent or low melting staple fibers can be added to increase the locking or binding of the needle punched face. The binding fibers are chosen depending on the hollow fibers used. Preferably the binding fibers are made from low melting polymer like PP or polyester preferably co-Polyester (coPET). The amount of binding fibers may not exceed 25% of the total weight of the face layer.

In areas where the wear is not substantial or a lower level of abrasion performance is asked for a part of the hollow fibers can be replaced with standard polyester solid fibers. Up to 55% of the total fibers used can be such solid staple fibers. This might also be colored fibers used to enhance the overall aesthetic performance of the needle punch face layer. Many car makers ask for a color matching to individualize the interior appearance of their cars.

The additional fibers are preferably made from the same or similar polymeric material as the hollow staple fibers used. Preferably all staple fibers used are based on the same polymers or family of polymers. Also the use of recycled polymers is an option that fits within the scope of the invention as claimed, in particular using polyester hollow fibers, eventually together with polyester solid fibers and/or conjugate binding polyester binding fibers, whereby part or all the polyester used is coming from recycled sources of polyester, such as bottle chips.

The needle punched carpet face layer according to the invention can be used as a decorative layer for instance as a cover layer for interior trim parts, like a parcel shelf, the trunk floor, or the back of the seats. For this it is enough that the needle punched carpet has an adhesive layer matching the trim part production, normally a thermoplastic material. It is also possible to use the needle punched carpet as the decorative top layer for an optional or throw-in mat, with additional backing layers to comply with the additional requirements specific for such optional mats, like stiffness or anti-skidding. For instance a backing layer of felt, flocking or rubber might be used.

Another possibility is the use of such needle punched material as a decorative face layer for main floor systems. For this the material normally obtains one or more backing layers which perform the acoustic function of the part, like for instance a heavy or mass layer and a decoupling layer to form a noise insulator. Another option is to use an airflow resistant layer for instance a foam or felt layer to obtain a sound absorber.

For instance the acoustic systems as disclosed in EP 0934180 A, EP 2365483 A or EP 2364881 A, a decorative top layer in the form of for instance a needle punched carpet is used, that has normally no influence on the acoustic performance of the underlying acoustic system. The carpet face layer according to the invention can be used with the acoustic systems as disclosed in these applications without negative interference with the acoustic properties of the disclosed systems.

The face layer according to the invention is porous. However, it will enhance possible acoustic absorbing properties only marginally, as it was measured that the face layer according to the invention has not a considerably absorbing property on its own. Against the published believe that hollow fibers can be used to produce an acoustic absorbing layer, this could not be proven for the needle punch carpet layer according to the invention. The reason might be that the process parameters used to produce an acoustic layer are different for those producing a carpet layer.

The area weight of needle punch decorative carpet face layers used as standard in vehicles are dependent on the area of use as well as the exclusivity of the car, normally in a range between 180-800 gr/m$^2$. For instance in the high end car segment this can be up to 700 gr/m$^2$, while in the low end car segment this can be as low as 200 g/m$^2$.

As the needle punched carpet is used as an aesthetic or decorative face layer the web may be kept as a plain web or the plain needle punched carpet layer may be further enhanced by additional needling to give a more structured surface, this may be in the form of a ribbed, velour or random velour, also known as dilour. Other surface treatments to enhance the appearance without impairing the abrasion results are also possible and fall in the scope of this disclosure.

The needle punched face layer according to the invention, eventually combined with one or more backing layers can be molded to form a part for the interior of a car, for instance the main flooring or the trunk area. The 3D forming can be done by cold and/or hot molding using the conversion processes normally used in the automotive industry.

DETAILED DESCRIPTION

Figure 1:
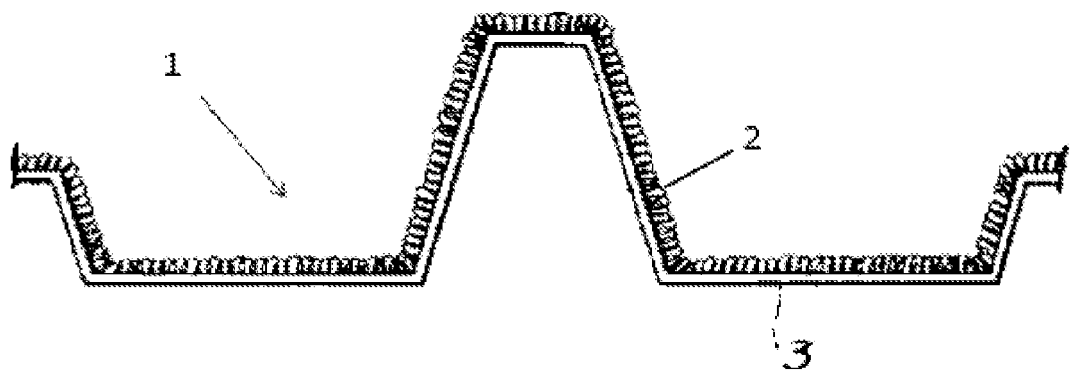
FIG. 1 is a cross section of a molded carpet for a vehicle according to the state of the art.

FIG. 1 shows cross section of a molded carpet flooring 1 for a vehicle according to the state of the art comprising a carpet surface layer 2 which can be either a needle punched or tufted surface layer, and a backing layer 3, for instance a latex, thermoplastic, foam or felt layer, these layers can be laminated to each other using an adhesive layer. The backing layer can also be a multilayer system, as known in the art, to enhance acoustic properties in the car. For instance an insulating layer in the form of a mass layer together with a spring layer in the form of a foam or felt layer can be used. The carpet as shown is molded to follow the floor of the vehicle. Molding is done using hot or cold molding as known in the art.

Figure 2:
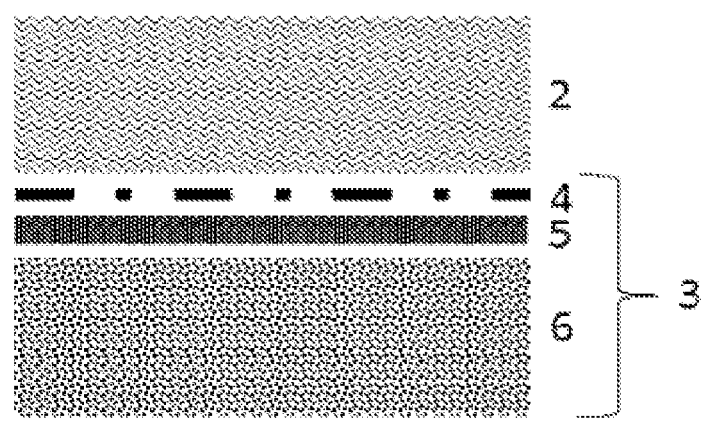
FIG. 2 is a schematic of a layered carpet with the face layer according to the invention.
Figure 3A:
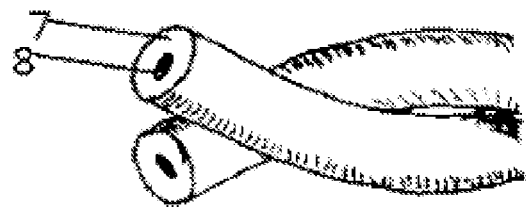
FIG. 3A is a perspective view of a hollow fiber.
Figure 3B:
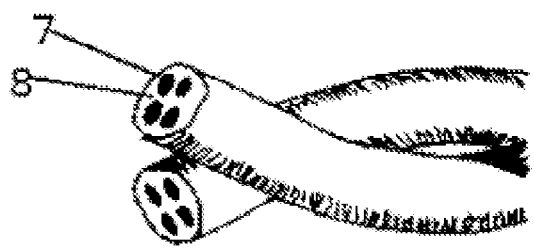
FIG. 3B is a perspective view of a hollow fiber.
Figure 3C:
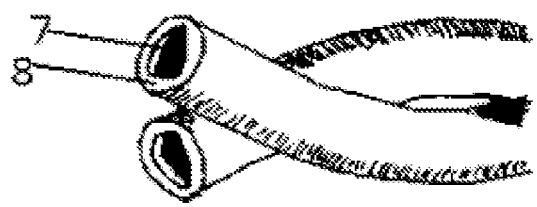
FIG. 3C is a perspective view of a hollow fiber.

In comparison, the needle punch carpet according to the invention (FIG. 2) can suffice with the needle punch face layer according to the invention on its own, without the need of the fiber locking layer and the secondary layer, and will already have an increased abrasion performance.

If necessary an adhesive layer 4 can be used to bind the needle punch face layer directly to the substrate or other car parts in need of a needle punched face layer. Although it is not needed it might be preferable, in heavy used areas for instance, to use a light fiber locking system, for instance binding fibers in the face layer and/or a non-latex backing layer, for instance polyolefins such as LDPE, HDPE, PP or polyolefin dispersions such as Fixamine, and/or a latex backing layer eventually combined with an LDPE or other thermoplastic polymer material.

The needle punched surface 2 according to the invention can be combined with a mass spring system containing a non-porous heavy or mass layer 5, for instance EPDM, EVA, PP, PE based layer, such a layer may be filled with minerals, and a decoupling layer 6, for instance a foam or felt layer. Eventually an adhesive layer 4 might be used between the layers. Also a combination of the needle punched face layer according to the invention with a porous backing layer or a single backing layer in the form of an acoustic absorbing layer is an option.

The needle punched face layer according to the invention can also be used for a throw-in mat in the foot well area of the passengers. In particularly in the area before the front seats, the face layer can then be combined with anti-skid backing and possible rubber inlay areas to form such mats as known in the art. Also these mats might be molded to follow the form of the area where they are used.

Sample Preparation,

Needle punched face layers were produced using a standard industrial scale needle punch carpet production line. Staple fibers as indicated were mixed and formed in a bat or mat using carding and cross-lapping. The mat was pre-needled using plain barbed needles to form the carpet face layer. The needle punched surface layers were subjected to a second dilour patterning step using fork dilour needles. For all samples the same settings were used.

Samples were coated with latex and LDPE backing, eventually combined with a standard felt backing layer. All samples were made with black solution dyed staple fibers, as these are used for the production of automotive carpets in general.

The samples were all tested for abrasion using the taber test according to DIN 53109 or the equivalent SAE J1530. The Test was performed on a Taber Abrader testing machine with a H18 grinding disk, and 10N pressure force. First after 300 cycles and then after every 1000 cycles the weight loss was measured until end of cycle was reached. Other changes on the sample like bearding were made notice of. The test was stopped and the end of cycle noted as soon as a hole in the needle punched surface was observed. The g weight loss measured was normalized for g weight loss per 1000 cycles to enable comparison.

Reference sample 1: PES solid fibers of around 13 dtex and a staple length of 76 mm were carded and cross lapped to form a mat with an area weight.

Examples according to the invention were made the same as the reference sample using hollow PES. The hollow PES fibers were around 12 dtex, with a staple length of 60 mm. The hollow fiber used has a round cross section and one void, the void area is round. Samples with 100%, 70% and 30% by weight of hollow fibers were made, by blending with the same solid PES fibers as used in the reference sample. Although the dtex of both fibers are similar, due to the void area in the hollow fiber, this fiber is coarser. Chemical analyses of the different PES fibers did not show relevant differences between the materials used for producing the different staple fibers.

All samples measure had the same area weight for the top needle punched surface layer of around 400 g/m$^2$.

Figure 4:
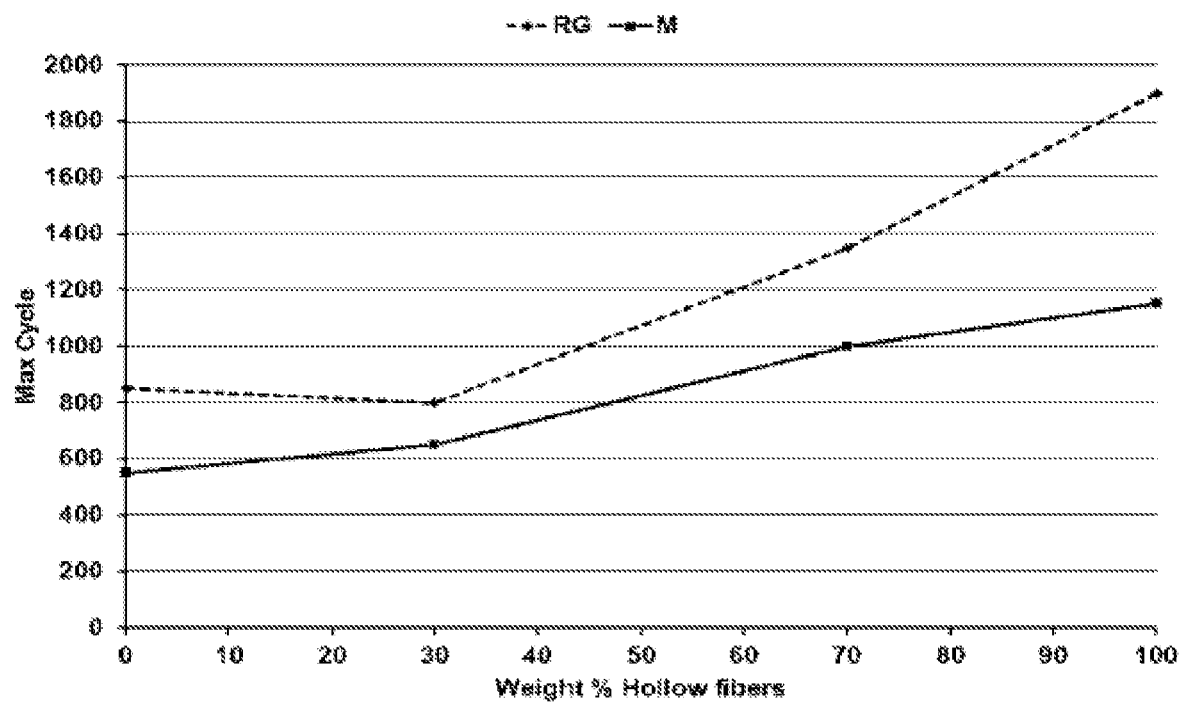
FIG. 4 shows results of an abrasion test for a sample with different hollow to solid fiber ratios.
Figure 5:
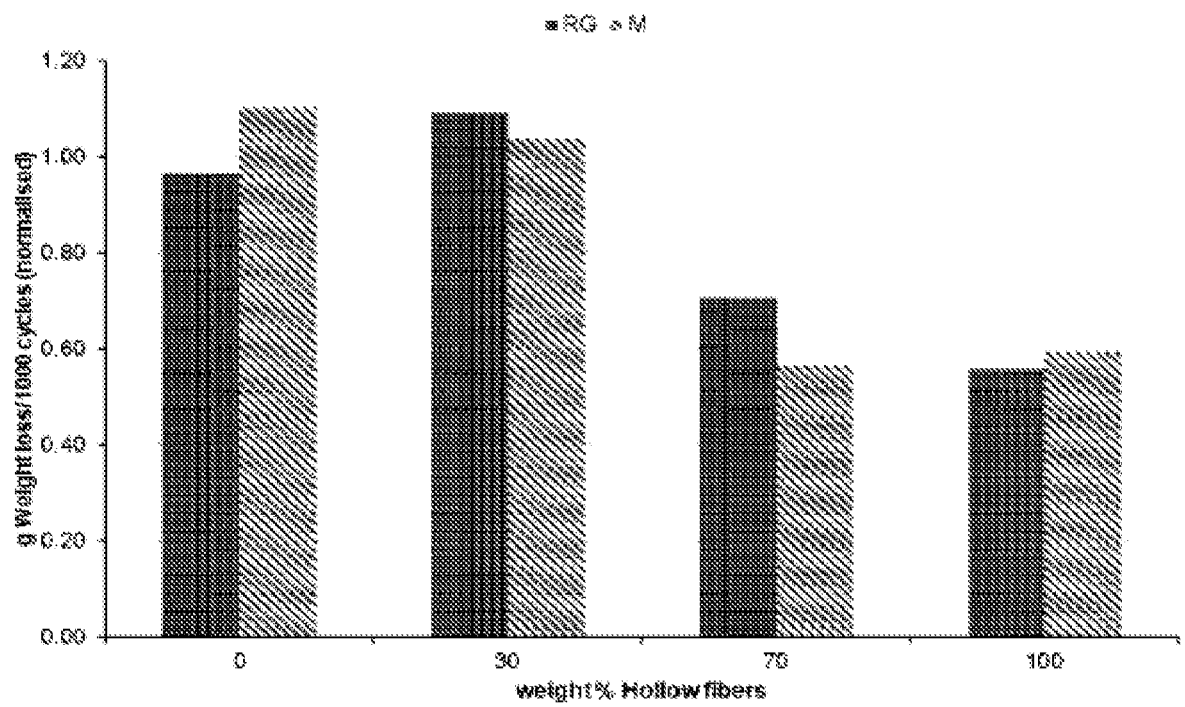
FIG. 5 shows results of an abrasion test for a sample with different hollow to solid fiber ratios.

FIGS. 4 and 5 show the results of the taber test for all samples as roll good and as molded part. FIG. 4 shows the maximal cycles that could be achieved before a first sign of a hole became visible, while FIG. 5 shows the g weight loss, normalized for 1000 cycles for the same samples.

Surprisingly the samples with a hollow fiber content of 70% and 100% by weight showed an increased overall performance for the same area weight of the top needle punched layer. The end of cycle found in the roll good state (RG) was up to more than double that measured for the 100% solid fiber reference sample. While even in the molded carpet (M) the difference between the reference and 100% Hollow fiber sample was almost 2 fold. Surprisingly the abraded surface did not show a substantial whitening effect, while the one of the solid fiber reference sample was whitened to an unacceptable level at the end of cycle. Even more surprisingly the g weight loss measured and normalized for 1000 cycles showed a considerable reduction for the 70 and 100% by weight hollow fiber samples for both the roll good carpet (RG) and the molded carpet (M).

It seems that a certain % by weight of hollow fiber must be present in the sample to obtain the better overall abrasion performance, like the increase in maximum cycles and the g weight loss reduction. Based on these and other samples not shown the threshold value is expected to be around at least 45-50% by weight of hollow fibers, to have an increase in abrasion performance. Whereby 100% by weight of hollow fibers showed the best performance.

This is important as for certain car makers a color matching is necessary, whereby different color staple fibers are mixed, and a pure 100 weight % hollow fiber is than not necessary or economical. However by at least around 50 weight % hollow fibers, still a satisfying result can be achieved. These hollow fibers can be mixed up to 100% with colored solid fibers and/or binding fibers depending on the specific request of the costumer.

Unexpectedly, comparison of the results with a standard PES needle punched carpet as currently sold on the market (results not shown) revealed that at a weight reduction of 200 g/m² (600 g/m² for the carpet surface found on the market vs. 400 g/m² for the carpet surface according to the invention) the same abrading performance could be achieved.

The sample with 30% hollow fibers shows similar results in comparison to the reference sample. This might indicate that there is a threshold for the amount of hollow fibers used to make an impact on the abrasion performance. Considering the data the threshold is expected to be at least more than 50% by weight of the overall fibers used for the needle punched top layer according to the invention In comparison, the needle punch carpet according to the invention can suffice with the needle punch face layer according to the invention on its own, without the need of the fiber locking layer and the secondary layer, and will already have an increased abrasion performance.

None of the samples according to the invention, containing more than 50 weight % hollow fibers showed a substantial whitening effect, while the market sample and the reference sample both showed a noticeable whitening of the abraded surface. This means that the appearance of the carpet over use is not substantially changing visibly in color and will longer appear new in comparison to a whitening carpet as currently on the market. Although some flattening of the top surface occurred also for the samples according to the invention during the abrasion tests, due to the fact that the color remained the same, the flattening was less apparent.

What is claimed is:

1. A moulded carpet flooring, comprising:
an abrasion resistant decorative facing layer consisting of a needle punched carpet made of a single non-woven web having an area weight of between approximately 180-800 g/m2, and which is comprised of polyester hollow staple fibers not of conjugate or bicomponent construction and other staple fibers, processed by a first needle punching process and a second needle punching process to form a structured surface in form of ribs, velour, or random velour, wherein a hollow staple fiber content of the facing layer is at least more than 30% by weight of the total staple fiber content;
a backing layer associated with the facing layer; and
wherein the moulded carpet flooring is formed into a 3D shape.

2. The moulded carpet flooring according to claim 1, wherein the backing layer is at least one of a foam layer, a felt layer, a heavy layer, and a non-latex backing layer.

3. The moulded carpet flooring according to claim 1, wherein the backing layer is heavy mass layer, and further comprising a decoupling layer.

4. The moulded carpet flooring according to claim 1, wherein the hollow staple fibers have a cross section with at least one void area comprising approximately 15 to 35% of the total cross sectional area of the hollow staple fibers.

5. A moulded carpet flooring, comprising:
an abrasion resistant decorative facing layer produced from a single fibrous non-woven web processed by a first needle punching process and a second needle punching process to from a structured surface in form of ribs, velour, or random velour, the facing layer having an area weight of between approximately 180-800 g/m2 and comprised of hollow staple fibers and other staple fibers, wherein the hollow staple fibers are made of polyester and are not of conjugate or bicomponent construction, and wherein a hollow staple fiber content of the facing layer is at least more than 45% by weight of the total staple fiber content;
a backing layer associated with the facing layer, wherein the backing layer is a heavy layer comprised of a mass spring system; and
wherein the facing layer is the topmost layer of the moulded carpet flooring.

6. The moulded carpet flooring according to claim 5, wherein the mass spring system is a non-porous mass layer.

7. The moulded carpet flooring according to claim 5, wherein the heavy layer is filled with minerals.

8. The moulded carpet flooring according to claim 5, further comprising a decoupling layer associated with the backing layer comprised of foam or felt.

9. The moulded carpet flooring according to claim 5, wherein a needled surface of a facing layer is at least one of plain and a structured surface.

10. The moulded carpet flooring according to claim 5, wherein the carpet is formed into a 3D shape.

11. The moulded carpet flooring according to claim 5, wherein the hollow staple fibers have a cross section with at least one void area comprising approximately 15 to 35% of the total cross sectional area of the hollow staple fibers.

12. The moulded carpet flooring according to claim 5, wherein at least a portion of the other staple fibers comprise binding fibers that do not exceed 25% of the total weight of the facing layer.

13. The moulded carpet flooring according to claim 5, wherein the hollow staple fibers and the other staple fibers have a different dtex.

14. A moulded carpet flooring, comprising:
an abrasion resistant decorative facing layer produced from a single fibrous non-woven web processed by a first needle punching process and a second needle punching process, the facing layer having an area weight of between approximately 180-800 g/m2 and comprised of hollow staple fibers and other staple fibers, wherein the hollow fibers are made of polyester and are not of conjugate or bicomponent construction, and wherein a hollow fiber content of the moulded carpet flooring is at least more than 45% by weight of the total staple fiber content;
a backing layer associated with the facing layer;
wherein the facing layer is the topmost layer of the moulded carpet flooring; and
wherein the hollow staple fibers have a cross section with at least one void area comprising approximately 15 to 35% of the total cross sectional area of the hollow staple fiber.

15. The moulded carpet flooring according to claim 14, wherein a needled surface of a facing layer is at least one of plain and a structured surface.

16. The moulded carpet flooring according to claim 14, wherein the backing layer is comprised of foam or felt, and further comprising a decoupling layer associated with the backing layer.

17. The moulded carpet flooring according to claim 14, wherein the carpet is formed into a 3D shape.

18. The moulded carpet flooring according to claim 14, wherein at least a portion of the other staple fibers comprise binding fibers that do not exceed 25% of the total weight of the facing layer.

19. The moulded carpet flooring according to claim 18, wherein the binding fibers are conjugate fibers, bicomponent fibers, or low melting staple fibers.

20. The moulded carpet flooring according to claim 14, wherein the backing layer is a heavy layer comprised of a mass spring system containing a non-porous mass layer.

21. The moulded carpet flooring according to claim 20, wherein the heavy layer is filled with minerals.

22. The moulded carpet flooring according to claim 20, wherein the polyester is polyethylene terephthalate, polybutylene terephthalate, or polytrimethylene terephthalate.

23. The moulded carpet flooring according to claim 20, wherein the other staple fibers comprise polyester solid fibers, polyester binding fibers, or a combination thereof.

24. The moulded carpet flooring according to claim 5, wherein the backing layer is at least one of a foam layer, a felt layer, a heavy layer, and a non-latex backing layer adhesive layer.

25. The moulded carpet flooring according to claim 1, wherein the polyester is derived from recycled polyester.

26. The moulded carpet flooring according to claim 5, wherein the facing layer is abrasive resistant such that a Taber Abrader testing machine with a H18 grinding disk with an applied force of 10N will not create a hole in the facing layer until at least about 780 cycles have been completed.

27. The moulded carpet flooring according to claim 1, wherein a hollow staple fiber content is about 30% to about 100% by weight of a total staple weight content of the facing layer, and wherein when the facing layer is exposed to cyclic abrasion, the maximum number of cycles encountered before a hole becomes visible in the facing layer is greater than 600 cycles.

28. The moulded carpet flooring according to claim 27, wherein the moulded carpet flooring substantially has a first color before exposure to cyclic abrasion and a second color in the area of abrasion of the facing layer, and wherein the second color is substantially the same as the first color.

29. The moulded carpet flooring according to claim 27, wherein the moulded carpet flooring has a first weight before exposure to cyclic abrasion and a second weight after the hole in the facing layer becomes visible, wherein the normalized weight loss per 1000 cycles is less than about 1.5 grams.

\* \* \* \* \*